Nov. 8, 1949  P. F. DANIELSON  2,487,638
REAMER
Filed Aug. 28, 1946
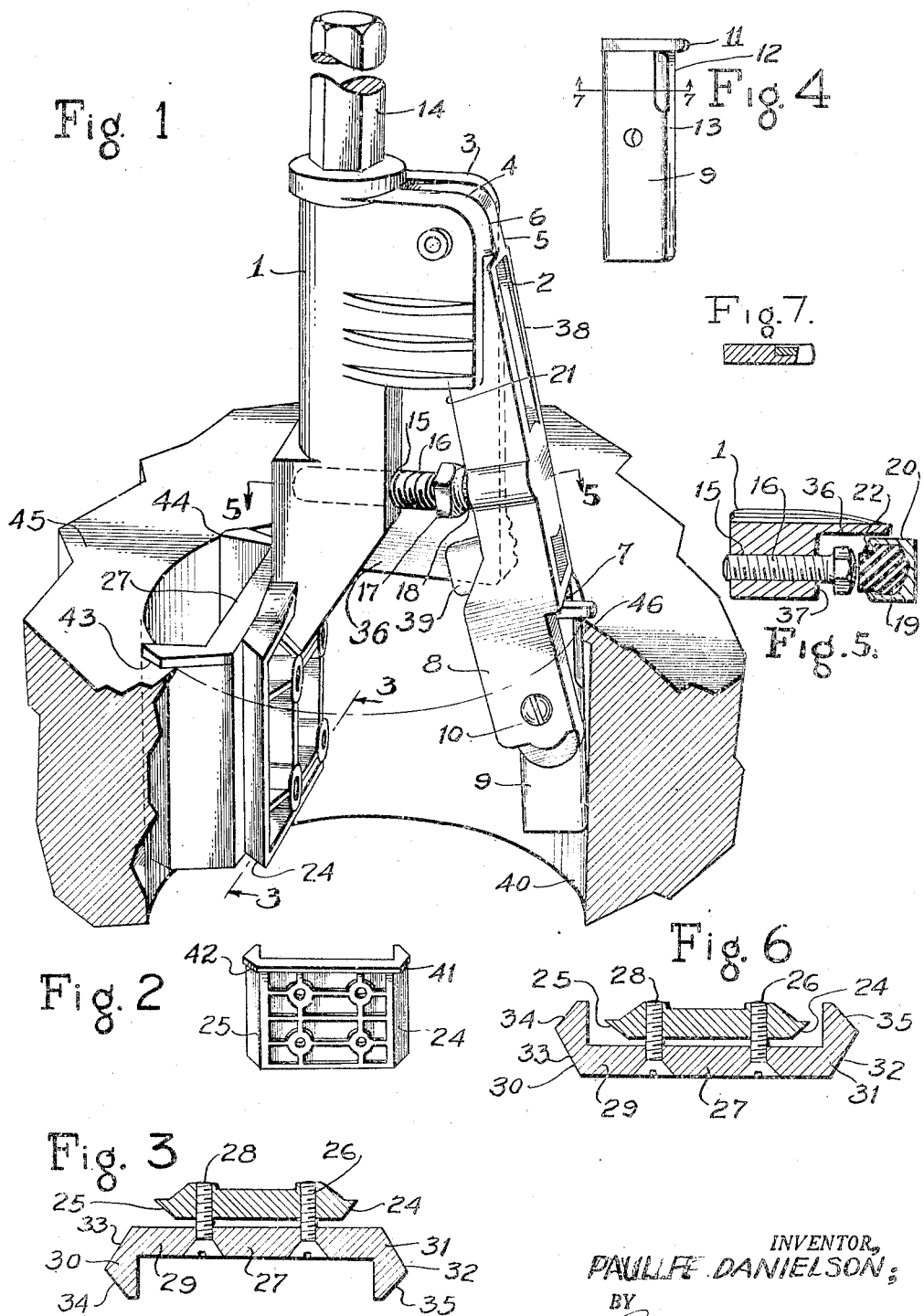
INVENTOR,
PAUL F. DANIELSON
BY
ATTORNEY Patented Nov. 8, 1949

2,487,638

UNITED STATES PATENT OFFICE 2,487,638

REAMER

Paul F. Danielson, Los Angeles, Calif.

Application August 28, 1946, Serial No. 693,476

3 Claims. (Cl. 77—2)

The present invention relates to reamers, and specifically to a type of reamer adapted to remove the uneven shoulder or ridge which is formed in a cylinder as a result of incomplete piston movement. Such incomplete piston movement causes uneven wear of the cylinder. When it becomes necessary to fit new pistons or new rings this ridge must be removed, otherwise the piston and the rings will not fit properly. If the ridge is not removed, the new piston and rings may strike the ridge as the piston reciprocates and may result in damage both to the piston and the rings as well as to the cylinder.

An object of the present invention is to provide a device which is inexpensive in cost of manufacture, and which removes a ridge without gouging the cylinder wall nor reaming the cylinder beyond the maximum diameter thereof.

Another object includes a reamer which incorporates a novel means for advancing the cutting edge of the reamer blade against the work.

Another object is the provision of a reamer which may be accurately centered relative to the cylinder to be reamed.

A further object is the provision of a reamer which is readily adjustable to different diameter cylinders.

A further object is the provision of a reamer which is sturdy in construction, manually adjustable during a reaming operation, efficient in use and generally superior to reamers now known to the inventor.

With the above-mentioned and other objects in view, the invention consists in the novel and useful provision, formation, construction, association and relative arrangement of parts, members and features, all as shown in one embodiment in the accompanying drawing, described generally and more particularly pointed out in the claims.

In the drawing:

Figure 1 is a fragmentary perspective view, partly in section, of a reamer embodying the invention, and shown within a cylinder in the process of removing a ridge;

Figure 2 is a perspective view of a plate member used in the practice of the invention;

Figure 3 is a sectional view taken substantially on the line 3—3 of Figure 1;

Figure 4 is a perspective view of a blade element used in the practice of the invention;

Figure 5 is a sectional view on the line 5—5 of Figure 1;

Figure 6 is a view similar to Figure 3, one of the elements being reversed as to position; and Figure 7 is a cross-section of Figure 4.

Referring now to the drawing, the improved reamer includes two levers 1 and 2, the lever 1 being formed at one end with a pair of spaced-apart outstanding lugs 3 and 4, functioning as knuckles for receiving therebetween a knuckle 5 formed on the upper end of lever 2. The knuckles are held together by a tubular pin 6. The opposite end of lever 2 is bifurcated to provide two spaced-apart parallel members 7 and 8 of identical construction, and between which is positioned blade 9. Blade 9 is swingingly mounted between said members 7 and 8 in any convenient manner such as by screw 10. The blade is elongated, as best shown in Figure 4 and the members 7 and 8 are so spaced as to have a close fit against the sides of the blade. The said blade 9 is provided at one end with a shoulder 11 and immediately beneath the shoulder is a cutting edge 12. This cutting edge is preferably hardfaced or made of some material which may be subjected to wear, such as carbo-alloy. The blade below the cutting edge 12, to wit, portion 13, performs no cutting function but is used as a guide means for the blade and to revolve the blade about the screw 10 when the portion 13 engages the cylinder wall, as hereinafter set forth.

The lever 1 is provided at one end with an angular sided extension 14 which permits the tool to be gripped by a suitable wrench and rotated. The lever 1 is provided at 15 with a transverse screw threaded bore adapted to receive a screw 16. This screw is provided with an angular sided head 17 and with a central convexity 18. The convexity 18 cooperates with a resilient tension button 19. The arm 2 is transversely bored at 20 to receive the tension button 19. It will be observed in Figure 5 that this button projects beyond the inner surface 21 of the arm 2 and when the button is within the bore 20 the metal surrounding the bore is upset to form an inwardly extended annular flange, as shown at 22. This effectively holds the button in position.

The arm 1 carries at its lower end a transverse plate 23. This plate has side edges 24 and 25 on a radius. This radius bears a relationship to the cutting edge of the blade when the arms are swung apart a given distance. Plate 23 is provided with one or more transverse screw-threaded bores 26, as best illustrated in Figure 2, whereby a second plate 27 may be secured thereto by screws 28. Plate 27 includes a substantially plane portion 29 provided with end flanges 30 and 31, edges 32 and 33 of said flanges being on one radius, while edges 34 and 35 are on a different radius. The plane portion 29 is transversely bored, the spacing of the bores corresponding to the spacing in plate 23. Figure 3 illustrates plate 27 in one position relative to plate 23, and Figure 6 a second position of plate 27. Thus in a single tool it is possible to adjust the reamer to different cylinder diameters. Specifically the tool illustrated will function efficiently in cylinder bores varying between 2⅜" to 4" in diameter.

The arm 1 is provided with a wall 36 which extends beyond the inner edge 37 of said arm and which wall is adapted to cooperate with the side 38 of arm 2. In this connection, it is to be observed that arm 2 is provided with a lateral extension 39 which parallels wall 36 and is adapted for slide engagement therewith.

The operation, uses and function of the invention just described are as follows:

It is intended that the proper size plate 27 should be fastened to plate 23 if plate 23 is improper as to size. Assuming that the diameter of the cylinder 40 requires an additional plate, plate 27 is fastened to plate 23 so that said plate is either in the position of Figure 3 or that of Figure 6. In Figure 1 the diameter of the cylinder bore is of large size with a consequence that the plate 27 is in the position illustrated in Figure 3, the edges 34 and 35 having substantially the same radius as the radius of the cylinder 40.

In order to properly center and carry the weight of the tool it is intended that the tool should be self-supporting and accordingly the plate 23 is provided with outstanding transverse shoulders 41 and 42 in the zone of the walls 24 and 25, and plate 27 is provided with transverse shoulders 43 and 44 projecting beyond walls 31 to 35, inclusive. In Figure 1 shoulders 43 and 44 function as feet which rest on the top 45 of the cylinder block adjacent the work area, and the shoulder 11 of the blade also rests on the same surface. The screw 16 is rotated to bring the convexity 18 against the tension button 19, see Figure 5. This movement of the screw maintains the arms 1 and 2 separated at their lower ends and so that the shoulders or foot portions of the plate 27 and of the blade carry the weight of and center the tool in the cylinder.

In Figure 1 the cutting edge 12 is brought into engagement with the ridge 46, which is to be removed. The edge 13 of the blade engages the wall of the cylinder and specifically that portion of the cylinder wall which is of the diameter to be finally attained after the reamer removes the ridge 46. The workman, through the medium of a suitable wrench, engages the extension 14 and rotates the tool clockwise, viewing Figure 1. The arms are in braced relationship due to the presence of the stress-resisting wall 36 carried by arm 21. The blade 9 is directed into cutting engagement with the ridge by the portion 13 thereof engaging that portion of the cylinder below the ridge. The tool is then rotated and the cutting edge removes the ridge. As the ridge is reamed the screw 16 is turned through the medium of a wrench engaging the portion 17 to increase the pressure which exists between the convexity 18 and the tension button 19. This action is continued until the ridge is completely removed.

It is to be observed in Figure 1 that the blade edge, which includes the cutting portion 12 and the portion 13, is at an angle to the normal bore of the cylinder when the blade engages the ridge 46. In fact, the lowermost end of said blade is engaging the cylinder wall in the position shown in Figure 1. As the reamer is rotated to cut the ridge the angle between the ridge and the inner surface of the cylinder gradually decreases. In other words, the blade fulcrums itself into working engagement with the ridge with the result that when the ridge is completely removed the work engaging edge of the blade is substantially parallel to the axis of the cylinder, with a consequent result that no further portion of the cylinder is cut away. Hence, irrespective of the manner in which the ridge was formed, and regardless of its shape, the present reamer will remove the ridge without undercutting the cylinder wall. Any off-centering, due to difference between the major and minor axes at the ridge portion, does not affect operation of the tool but allows a flush removal of the ridge and a centered cut.

The method of applying pressure between the adjusting screw 16 and the tension button 19 eliminates all chattering and gouging during operation of the tool. The tension button allows the arms to swing inwardly and outwardly and still maintain a proper tension on the cutting edge of the blade against the ridge and during rotation of the tool. Thus, the tool seems to float as it is rotated and allows the ridge to be properly reamed without any fear of the tool gouging the work due to an irregularity in the shape of the ridge.

The construction permits for accurate centering of a boring tool within a cylinder with a means which includes the screw 16 and the tension button 19 for advancing the cutting edge of the blade during rotation of the tool, together with a blade construction which does not cut the cylinder any deeper than the maximum diameter thereof and which will remove a ridge regardless of its form and shape.

I claim:

1. A reamer, including: a pair of arms hinged together; means for resiliently separating said arms, one of said arms provided with an elongated blade formed along one edge with a cutting portion and with a non-cutting portion, said blade provided with a shoulder adjacent the cutting portion, said opposite arm provided with a transverse plate, the lateral edges of which are formed on a radius, there being transverse shoulders adjacent said lateral edges, said reamer adapted to be placed within a cylinder, the shouldered portions of said plate and said blade adapted to rest on the cylinder block adjacent the area to be reamed, and for supporting the tool.

2. A reamer for removing the ridge formed in the upper end of a cylinder block, said reamer including: a plate formed with elongated transverse flanged portions, the edges of which are on a radius to correspond to the radius of the cylinder, and provided with shoulder portions overlying the transverse edges and functioning as feet adapted to rest on the top of a cylinder block to support said plate; an elongated blade provided with a short-length cutting edge and with an overlapped shoulder portion which functions as a foot for resting on the top of said cylinder block, the said foot of the blade and the foot portions of the plate forming a three-point suspension for the reamer; and means between the plate and said blade for progressively separating the same during cutting action by the blade on work.

3. A reamer for removing the ridge formed in the upper end of a cylinder block, said reamer including: a plate formed with elongated transverse flanged portions, the edges of which are on a radius to correspond to the radius of a cylinder, and provided with shoulder portions overlying the transverse edge and functioning as feet adapted to rest on the top of a cylinder block to support said plate; an elongated blade provided with a short-length cutting edge and with an overlapped shoulder portion which functions as a foot for resting on the top of said cylinder block, the said foot of the blade and the foot portions of the plate forming a three-point suspension for the reamer; and means between the plate and said blade for progressively separating the same during cutting action of the blade on work, said means comprising a screw and a tension button for resiliently urging the blade into work engagement.

PAUL F. DANIELSON.

REFERENCES CITED

The following references are of record in the file of this patent:

UNITED STATES PATENTS

| Number | Name | Date |
| --- | --- | --- |
| 1,672,757 | Gabrielse | June 5, 1928 |
| 1,824,494 | Olson | Sept. 22, 1931 |
| 2,226,015 | Phillips et al. | Dec. 24, 1940 |